AUDIENCE PREFERENCE ANALYSIS SYSTEM UTILIZING CONTINUOUSLY INTERROGATED RESPONDER STATIONS

Filed June 29, 1959 9 Sheets-Sheet 1

INVENTOR
KENNETH JONES
BY Hane and Nydick
ATTORNEYS

INVENTOR
KENNETH JONES
BY Haseltine and Nydick
ATTORNEYS

June 11, 1963 K. JONES 3,093,795

AUDIENCE PREFERENCE ANALYSIS SYSTEM UTILIZING CONTINUOUSLY INTERROGATED RESPONDER STATIONS

Filed June 29, 1959 9 Sheets-Sheet 3

INVENTOR
KENNETH JONES
BY Hane and Nydick
ATTORNEYS

INVENTOR
KENNETH JONES
BY Hane and Nydick
ATTORNEYS

INVENTOR
KENNETH JONES
BY Hane and Nydick
ATTORNEYS

INVENTOR
KENNETH JONES
BY Hane and Nydick
ATTORNEYS

June 11, 1963 K. JONES 3,093,795

AUDIENCE PREFERENCE ANALYSIS SYSTEM UTILIZING CONTINUOUSLY INTERROGATED RESPONDER STATIONS

Filed June 29, 1959 9 Sheets-Sheet 7

INVENTOR
KENNETH JONES
BY Kane and Nydick
ATTORNEYS

June 11, 1963 K. JONES 3,093,795

AUDIENCE PREFERENCE ANALYSIS SYSTEM UTILIZING CONTINUOUSLY INTERROGATED RESPONDER STATIONS

Filed June 29, 1959 9 Sheets-Sheet 8

INVENTOR
KENNETH JONES
BY Hane and Nydick
ATTORNEYS

INVENTOR
KENNETH JONES
BY Haine and Nydick
ATTORNEYS 3,093,795
Patented June 11, 1963

3,093,795

AUDIENCE PREFERENCE ANALYSIS SYSTEM UTILIZING CONTINUOUSLY INTERROGATED RESPONDER STATIONS

Kenneth Jones, Rickmansworth, England, assignor of one-half to Attwood Statistics Limited, London, England, a British company Filed June 29, 1959, Ser. No. 823,519
6 Claims. (Cl. 325—31)

This invention relates to systems of remote indication and more particularly to systems for indicating at a central point the state of apparatus such as radio and television broadcast receiving sets located at a plurality of points remote from such central point.

The various features and advantages of the invention will be apparent from the following description of embodiments thereof, given by way of example and illustrated in the accompanying drawings of which:

Figure 2:
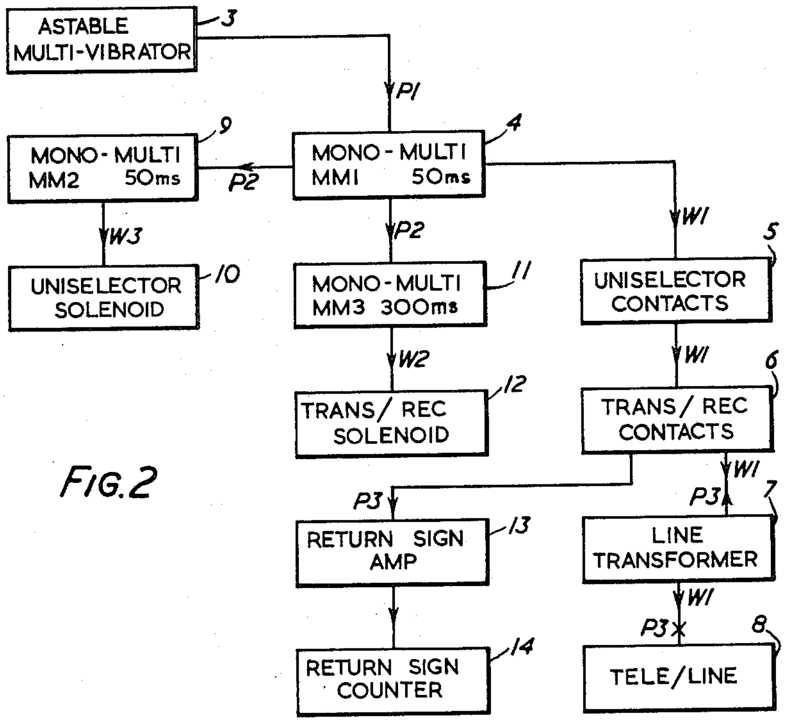
FIGURE 2 is a block schematic diagram of one form of apparatus adapted for use in the system of FIGURE 1.
Figure 5:
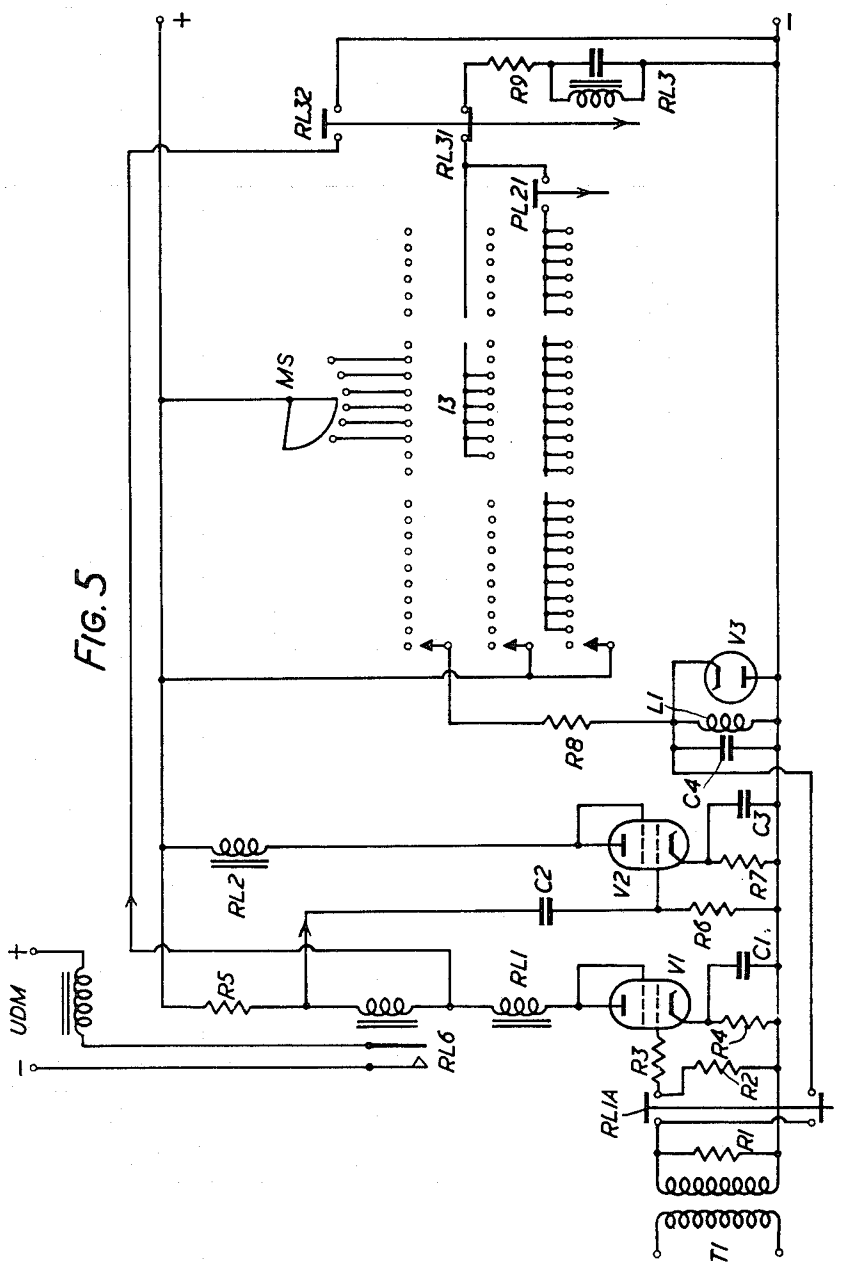
Figure 6:
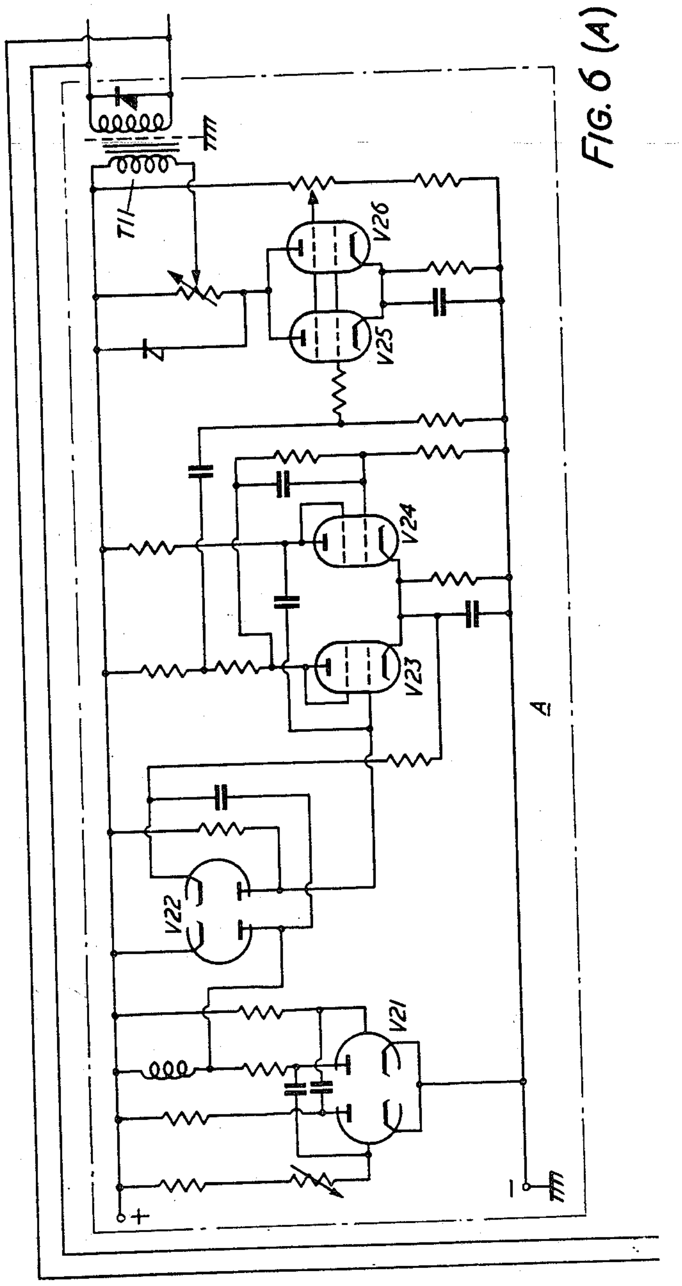
Figure 6:
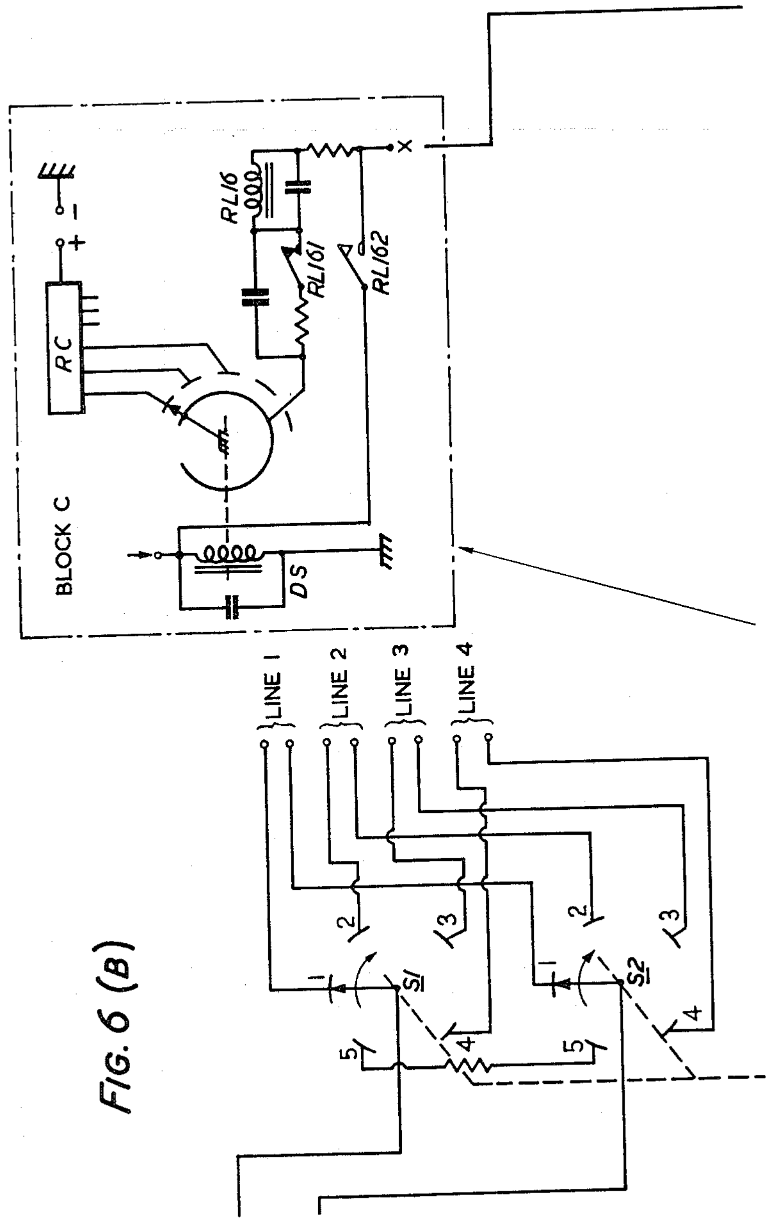
Figures 6C, 6E:
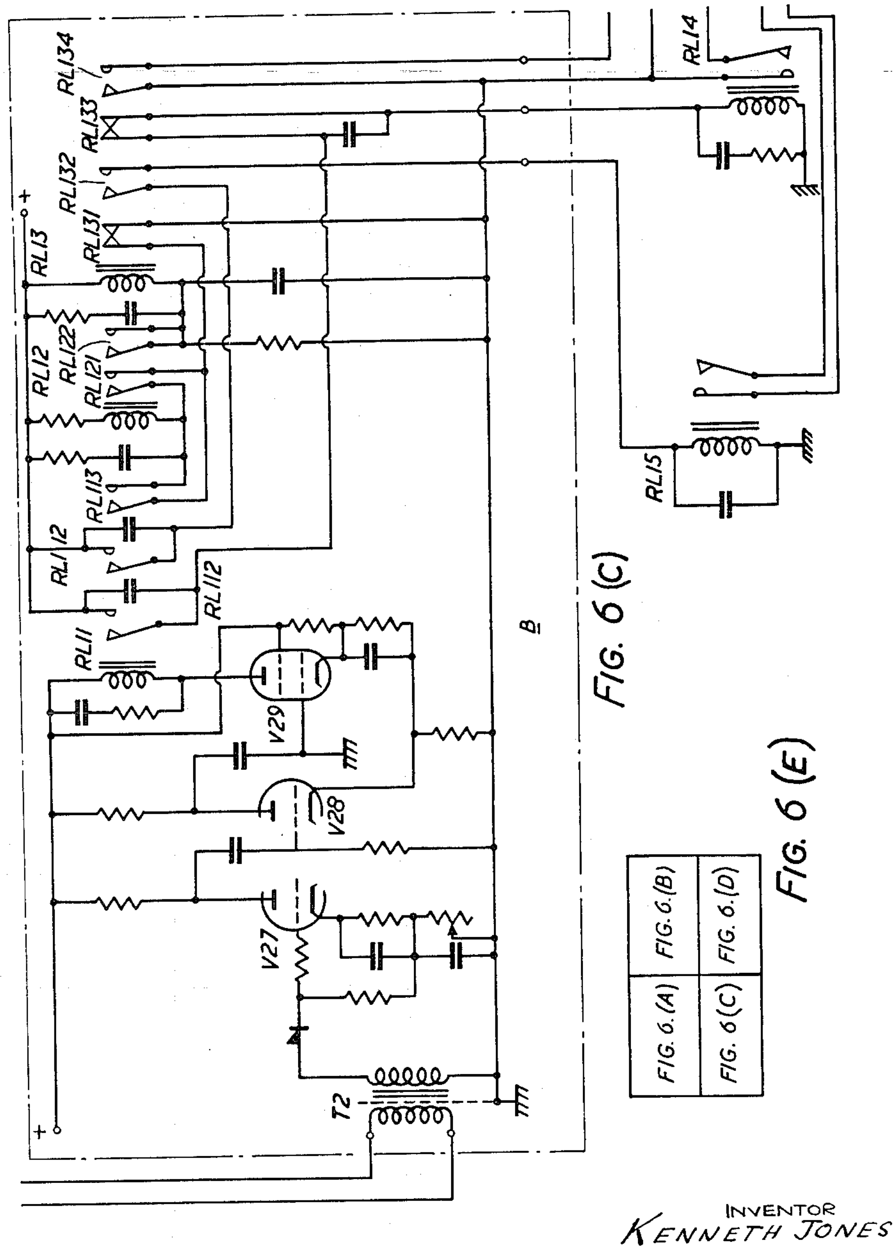
Figure 6:
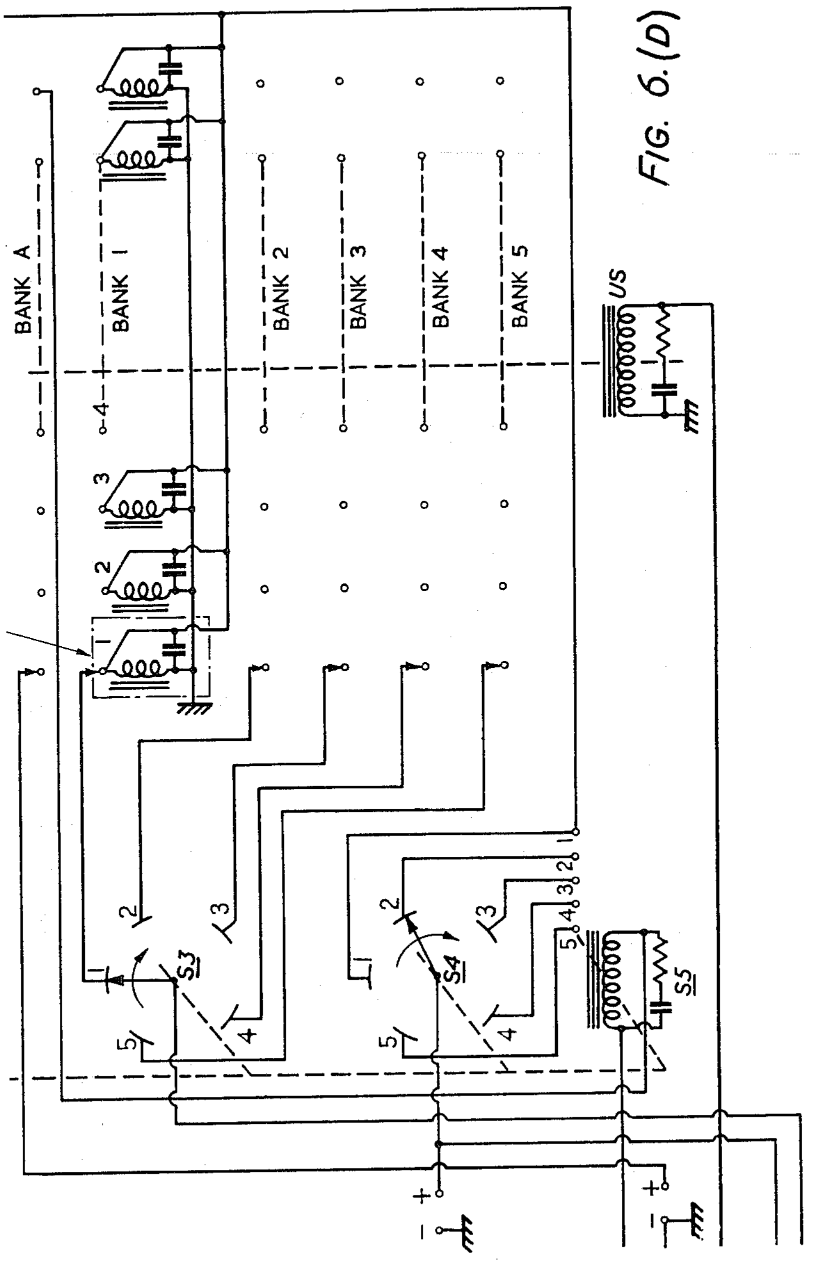

FIGURES 4A and 4B in conjunction are a detailed circuit diagram of the transmitting part of the apparatus shown in FIGURE 2;

FIGURE 4C is a layout of FIGURES 4A and 4B;

FIGURE 5 is a detailed circuit diagram of the responder part of the apparatus shown in FIGURE 2;

FIGURES 6A, 6B, 6C and 6D in conjunction are a circuit diagram of apparatus at the central point;

FIGURE 6E is a layout of FIGURES 6A, 6B, 6C and 6D, and

Figure 7:
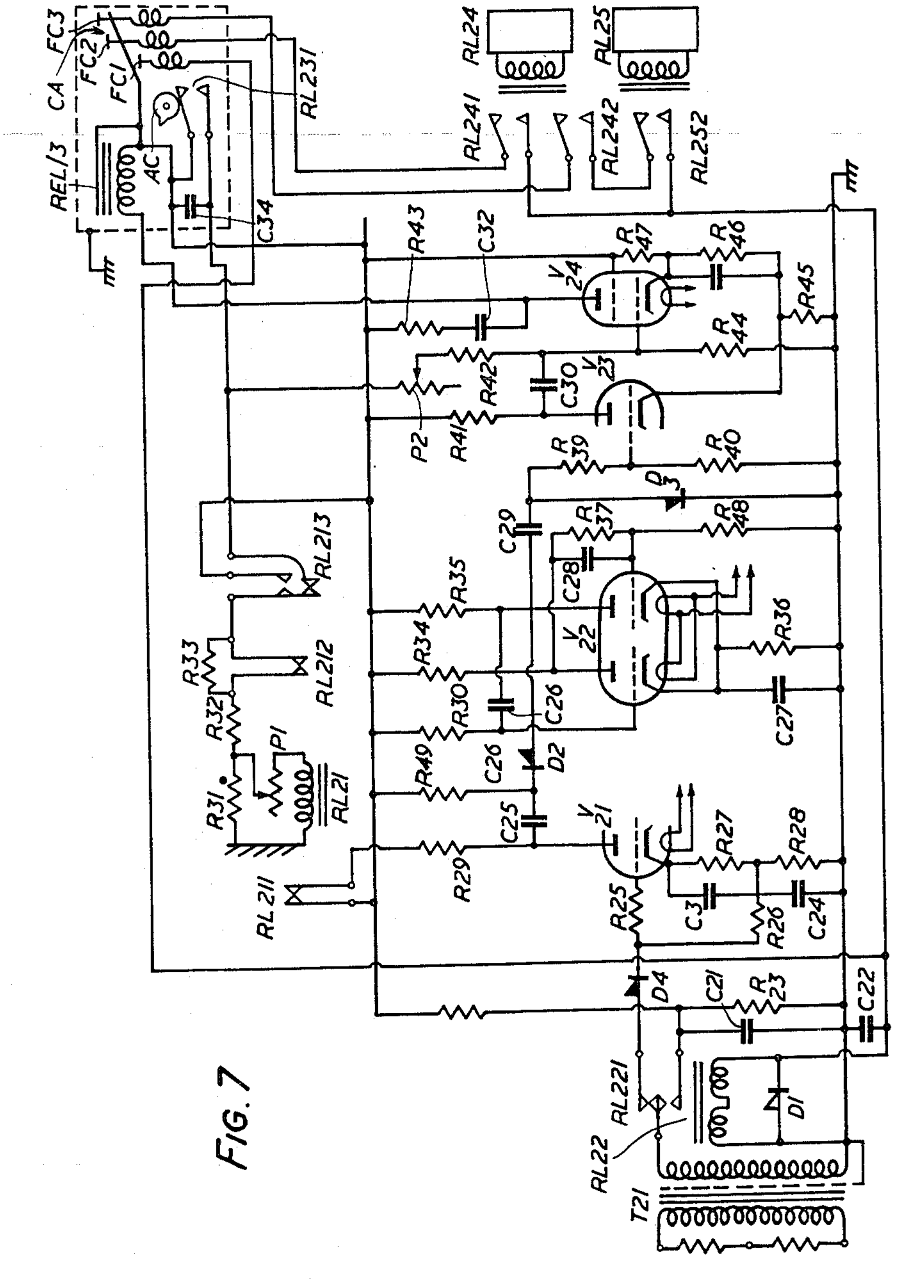

FIGURE 7 is a circuit diagram of responder apparatus at one of the remote points of the system.

Figure 1:
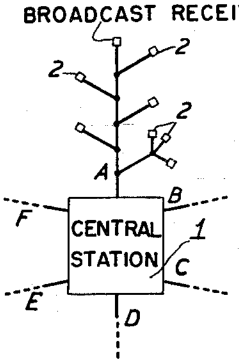
FIGURE 1 is a diagrammatic representation of the layout of a system according to the invention.

Referring to FIGURE 1 the central point or station 1 has apparatus for interrogating each of a plurality of broadcast receivers 2 at remote points over communication paths A, B, C, D, E, F. At each receiver 2 there is a responder unit arranged to respond to interrogation by the central station 1 to transmit back to the central station a signal indicative of the state of its associated broadcast receiver 2. Conveniently the communication paths are telephone lines but it will be appreciated that they could be lines laid solely for the purpose of the system or the interrogation and response signals could be superimposed on lines provided for other purposes than for telephone communication.

Switching arrangements at station 1 effect sequential interrogation of the paths A—F and the responders at the remote points on each path are arranged to respond in turn to the interrogation signals applied to their associated path. Between each interrogation the apparatus at station 1 is operative to receive response signals transmitted from the responder last interrogated which signals may for example indicate whether the receiver 2 being interrogated is switched on or not and which one of a plurality of broadcast channels it is tuned to.

For example, the responder devices are arranged in six groups and each group comprises twenty-five responders. The responders are interrogated at intervals of 400 ms. so that a group of twenty-five can be interrogated every ten seconds. The six groups can be interrogated in one minute by one transmitter and receiver device at station 1 connected in sequence to the six groups. Since the groups are separate the interrogation signals can be duplicated in each group thus reducing the number of separately identifiable interrogation signals required.

From the foregoing it will be seen that one hundred and fifty responders can be interrogated each minute. This enables a rapid check to be made of the conditions of the radio or television receivers associated with the responders and further, the results of the check can be made available immediately by, for example, connecting the receiver device at station 1 to an approprate indicating means.

Turning to FIGURE 2, the transmitter and receiver device at station 1 comprises an astable multivibrator 3 which generates timing pulses for example 2 ms. duration say every 400 ms. All the apparatus in the system is directly or indirectly synchronised from this multivibrator. Thus any error in the timing of the timing pulses merely alters the rate of interrogation and is ineffective otherwise to upset the operation of the system. The timing pulses are the pulses P1 in FIGURE 3.

The timing pulses from the multivibrator 3 in FIGURE 2 are fed to a mono multivibrator 4 which generates the interrogation pulses W1. The leading edges of these pulses are approximately coincident with the leading edges of the timing pulses and have a duration of 50 ms. The interrogation pulses are passed to a uniselector contact 5 from whence they are coupled via transmit/receive relay 6 to a transformer 7 which passes them to a telephone line indicated at 8.

The mono multivibrator 4 also feeds further synchronising pulses P2 coincident with the trailing edges of the interrogation pulses, and of 2 ms. duration, to a further mono multivibrator 9 which generates uniselector driving pulses W3 coincident with the leading edges of the further synchronising pulses. The uniselector driving pulses may be for example of 50 ms. duration and are fed to uniselector 10.

The further synchronising pulses are also fed to an additional mono multivibrator 11 which is arranged to actuate the solenoid of a transmit/receive relay 12. This solenoid may, for example, be of the slow-to-release type arranged to remain actuated for approximately 300 ms., as indicated at W2 in FIGURE 3, in response to a pulse of approximately 5 ms. duration generated by the multivibrator 11.

In the intervals between the interrogation pulses the apparatus is arranged to be responsive to response pulses P3 from the responders 2. These pulses are amplified by an amplifier 13 and applied to a return signal recorder 14.

Figure 3:
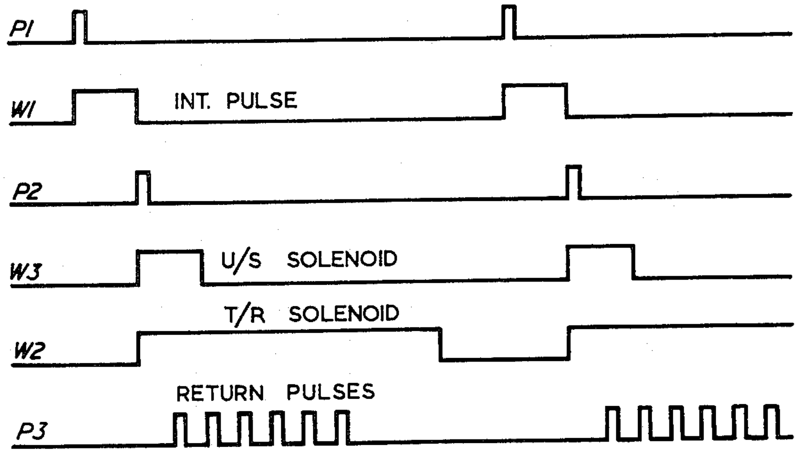
FIGURE 3 is a diagram showing typical waveforms associated with the apparatus of FIGURE 2.
Figure 4:
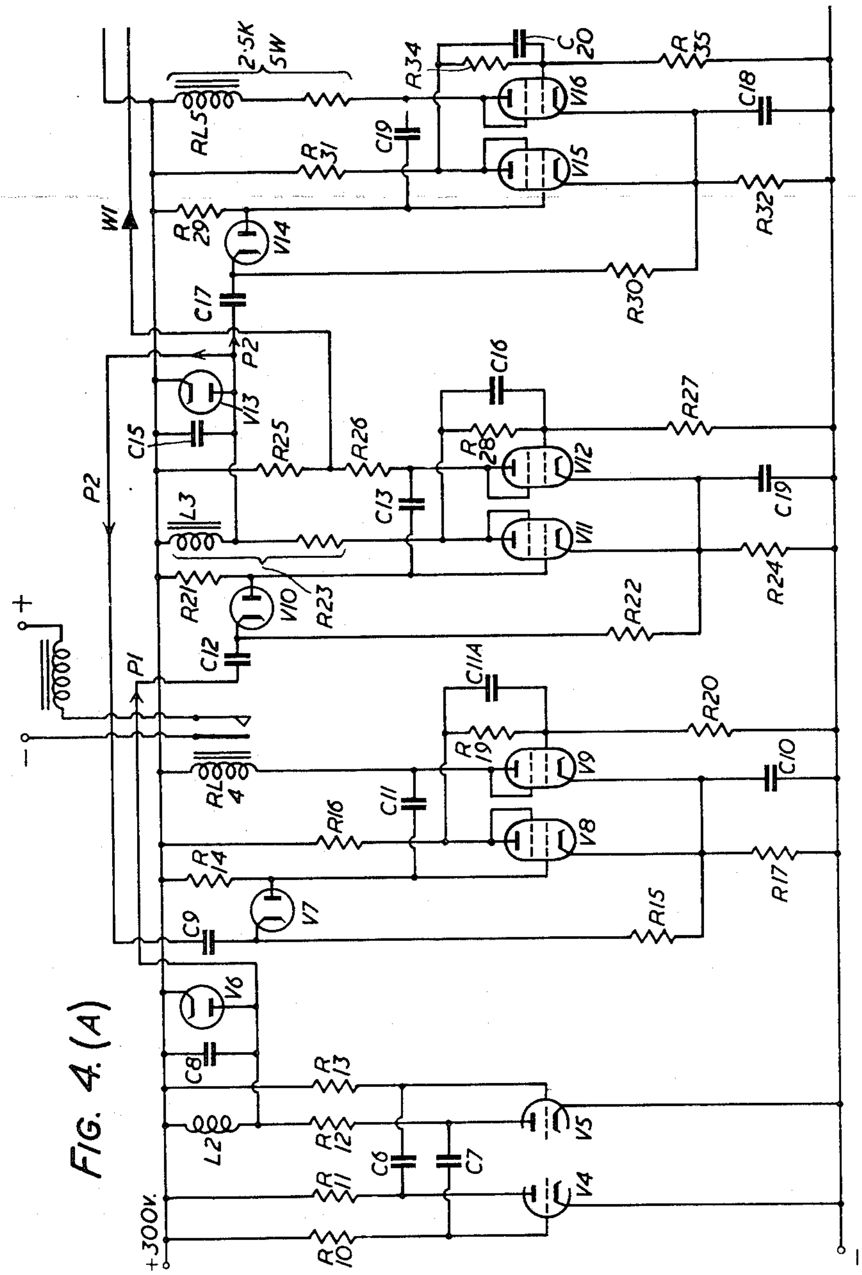

After each series of interrogations the transmitter device may be arranged to transmit a reset pulse to ensure that the responders are at their datum conditions ready for the next sequence of interrogations. Conveniently the interrogation and return pulses are of positive polarity as indicated in FIGURE 3 and the reset pulse of negative polarity. However, the polarities of the pulses can be varied in other forms of apparatus in accordance with the invention. In particular the reset pulse can be of positive instead of negative polarity.

FIGURES 4A and 4B are a circuit diagram of the apparatus shown schematically in FIGURE 2. The astable or free-running multivibrator 3 is constituted by the valves V4 and V5 arranged in a conventional multivibrator circuit. The output P1 developed across the choke L2 shunted by the capacitor C8 and diode V6 is applied through capacitor C12 and diode V10 to the grid of valve V11 and through resistor R22 to the cathodes of the valves V11 and V12 which valves, V11 and V12, together constitute a conventional monostable multivibrator. This multivibrator is triggered by pulse P1 and switches from its stable state to its unstable state and after a period of 50 ms. switches back to its stable state yielding an output pulse P2. This output pulse P2 developed across the choke L3 shunted by capacitor C15 and diode V13 is applied to the monostable multivibrators 9 and 11 (FIGURE 2) constituted by the valve pairs V8, V9 and V15, V16 respectively. Valve V12 also produces an interrogation pulse W1 of 50 ms. duration which is applied to the contacts of the uniselector 5.

Output pulse P2 is applied through capacitor C17 and diode 14 to the grid of valve V15 and through resistor R30 to the cathode of valve V16 and triggers the multivibrator V15, V16 from its stable state to its unstable state. Stage V15, V16 switches back to its stable state after a period of 300 ms. Valve V16 includes in its anode circuit the operating coil of a transmit/receiver relay RL5 and contacts RL5A of which are arranged to change over the connections from the transformer T2 coupling the apparatus to the outgoing line so that whilst relay RL5 is operated the line is coupled to a response signal amplifier V17. This amplifier comprises a pentode V17 with resistor R38 and capacitor C22 in its cathode circuit, and with resistor R36, response pulse repeating relay 14 and resistor R37 in series in its anode circuit. A capacitor C21 is connected between resistor R36 and the negative line. The stable state of stage V15, V16 is with V15 conducting and V16 non-conducting so that relay RL5 is unenergised. When the stage is triggered V16 conducts and operates relay RL5 to change over the circuit from the transmit state to the receive state. After 300 ms. the stage reverts to its stable state and relay RL5 is released thus restoring the circuit to the transmit state in readiness for the next interrogation pulse from stage V11, V12.

Output pulse P2 is also applied through capacitor C9 and diode V7 anode/control grid coupling between valves V9 and V8 and through resistor R15 to the cathodes of both these valves in common. In response to this pulse stage V8, V9 triggers from its stable state with V8 conducting and V9 non-conducting to its unstable state with V9 conducting and then reverts to its stable state. Whilst V9 is conducting the coil of relay RL4 in its anode circuit is energised and the normally open contacts of relay RL4 complete an energising circuit for the drive solenoid of the uniselector 5.

FIGURE 5 is a circuit diagram of a responder unit associated with a broadcast receiver 2 (FIGURE 1) which receives the interrogation pulses W1 sent over the line. These pulses are fed into the responder by an input transformer T1 and with the circuit as shown are applied to the grid of a valve V1 in the anode circuit of which are connected the winding of a transmit receiver relay RL1 and the winding of a uniselector control relay RL6.

The pulses being positive going cause valve V1 to conduct and thus energise relays RL1 and RL6. Relay RL1 is a slow to release relay and once operated holds up for 300 ms. The contacts RL1A of relay RL1 disconnect V1 from transformer T1 and connect the return pulse generating valve V3 to transformer T1. Thus if the responder is set to respond to the currently received interrogation pulse return pulses are transmitted back over the line to the station 1 by operation of the circuit of valve V3 in a manner to be described later.

Relay RL6 closes its contacts, when energised as valve V1 conducts, and completes an energising circuit for the drive magnet UDM of a uniselector switch 13 which performs the double function of determining which interrogation pulse the responder is to respond to and of controlling the response. The uniselectors of the responders associated with a line are each differently marked so that each has to step a different number of steps from a normal or reset position to render its responder operative. It will be assumed that the responder of FIGURE 5 is to respond to the thirteenth interrogation pulse. The uniselector is marked on its thirteenth contact and steps one step for each interrogation pulse received. Although relay RL1 is operated to switch from receive to transmit circuit condition upon receipt of each interrogation pulse no transmission from the responder takes place until the thirteenth interrogation pulse is received because the circuit of V3 is not actuated until this time.

In response to the thirteenth interrogation pulse the uniselector steps on to its marked contact and completes a self drive circuit which operates over the next group of contacts. The size of the group of contacts depends upon the maximum number of response impulses it is desired to send back to the station 1 and by way of example it will be assumed that this is three impulses. At each of the three contacts in the group the wiper of one bank of the uniselector applies any potential marking that contact over resistor R8 to the shunt arrangement of valve V3, coil L1 and capacitor C4 which serves as a pulse forming circuit and produces a 2 ms. pulse for each application of marking potential. The marking is effected by a manually operable switch MS which, as shown in FIGURE 5 is positioned to apply positive potential to the thirteenth, fourteenth, and fifteenth contacts of one bank of the uniselector. This manual switch is arranged to be positioned in accordance with the operating condition of the broadcast receiver with which the responder is associated.

If for example the first contact of the group is marked whenever the responder is operative, the second is marked when the receiver associated with the responder is tuned to channel A and the second and third contacts are marked when the receiver is tuned to channel B, the circuit of V3 will provide one pulse to indicate that the responder is operative but the receiver is not operating, two pulses to indicate that the receiver is operating and tuned to channel A and three pulses to indicate that the receiver is operating and tuned to channel B. It will be appreciated that more than three pulses could be used to indicate tuning selection between a greater number of channels and for this purpose the manual switch is shown as having six positions corresponding to marking of up to six contacts.

The self drive circuit for the switch is brought into operation by the energisation of relay RL3 over the group contacts of one bank of the switch, contacts RL31 and RL32 of this relay serving to complete an energising circuit for relay RL6 and to interrupt its own energising circuit each time relay RL3 is operated. A capacitor shunting the winding of relay RL3 slows its operation and release to provide a desired stepping rate and thus a desired rate of return impulsing over the line.

When the switch has stepped over the group of contacts providing the return pulses it stops and awaits the reset pulse from station 1.

The next pulse sent over the line by the transmitting apparatus at station 1 is received at the input to valve V1 of the responder as a negative going pulse so that a positive pulse is generated at the anode of valve V1. This positive pulse is applied to the control grid of valve V2 causing the latter valve to conduct and energise a reset relay RL2 the winding of which is connected in the anode circuit of V2. Relay RL2 is slow to release and remains operated for a period of 500 ms. Its contacts RL21 serve to connect the circuit of relay RL3 to a homing or reset bank the contacts of which are all connected to positive potential so that relays RL3 and RL6 interact as before to drive the switch to its normal or reset position.

FIGURES 6A, 6B, 6C, and 6D show circuit details of a modified form of the transmitter apparatus of FIGURES 4A and 4B. In block A of FIGURES 6A to 6D the double triode V21 serves as the free running or astable multivibrator providing the timing pulses for controlling the operation of the apparatus and corresponds to the valves V4, V5 of FIGURES 4A and 4B. Diodes V6 and V10 of this latter figure correspond to the two halves of the double diode V22 and the monostable multivibrator constituted by valves V11 and V12 in FIGURES 4A and 4B correspond to valves V23 and V24 in FIGURES 6A to 6D.

Valve V23 produces at its anode output pulses of predetermined duration the frequency of occurrence of which is set by the astable stage V21, which output pulses are applied to the control grids of valves V25 and V26 in common, which valves feed the pulses as interrogation pulses to transformer T11. From the secondary winding of T11 the pulses are distributed over the lines 1–4 by operation of a distributor switch S1, S2, and are also applied via transformer T12 to a return signal amplifier the circuit of which appears in block B.

Valve V27 acts as a limiting input amplifier in the same manner as the input stage of the responder circuit which will be described in greater detail in connection with FIGURE 7. The output of V27 is applied to the control grid of valve V28 which with valve V29 constitutes a monostable multivibrator. Stage V28, V29 is switched by each pulse from block A via input stage V27 from its stable state with V28 conducting and V29 non-conducting to its unstable state with V29 conducting and after a predetermined period it reverts to its stable state. During its period of conduction V29 energises the coil of a relay RL11 in its anode circuit which relay closes its contacts RL111, RL112 and RL113. Contacts RL111 complete a circuit, over normally closed contacts RL133 of a further relay RL13, for energising a uniselector control relay RL14 the contacts of which control energisation of the uniselector solenoid US so that the uniselector is driven one step each time relay RL14 releases.

Contacts RL112 prepare a circuit for energising a pulse expander relay RL15 and contacts RL113 complete a circuit over normally closed contacts RL131 to energise relay RL12.

Relay RL12 in operating locks up over its own contacts RL121 and, at its contacts RL122, completes a circuit for energising relay RL13.

Relay RL13 in operating opens its contacts RL131 and RL133, thus interrupting the energising circuits of relays RL12 and RL14 respectively, and closes its contacts RL132 and RL134. Contacts RL132 complete the circuit for relay RL15 prepared by contacts RL112, and contacts RL134 prepare a circuit for energisation of the solenoid SS which operates the switches S1—S4.

The windings of relays RL12 and RL13 are shunted by capacitors so that their release times are slowed to an extent sufficient for relay RL11 to respond to each of the incoming response pulses sent back over the line by a responder unit interrogate by the transmitter pulse. Each of these response pulses is repeated by relay RL11 at its contacts RL112 and over contacts RL132 which are now closed to relay RL15. The coil of relay RL15 is shunted by a capacitor so that its release time is lengthened and it in turn repeats expanded versions of the response pulses to distributor switch S3 connected to a corresponding contact of the uniselector.

The potential applied to the uniselector contact by the operation of relay RL15 energizes a drive solenoid DS for a rotary switch which acts as a storage device for the response pulses by driving round one step for each pulse received and remaining in this position until reset in a manner to be described later. An example of the circuit of the rotary switch associated with each of the uniselector contacts is shown in block C.

After a period determined by the release times of relays RL12 and RL13 the circuit of block B restores to its initial state in readiness for the next transmitter pulse. The uniselector is stepped one step for each transmitter pulse received and the block C circuits associated with its successive contacts store the response pulses returned by each of the responders associated with the line being interrogated. For example twenty five responders, the circuits of which will be described in detail in connection with FIGURE 7, may be associated with each line and the distribution S1, S2 distributes the first twenty five interrogation pulses to line 1. When the uniselector steps to its twenty fifth contact to record the response pulses from the twenty fifth responder associated with line 1 it also, over the twenty fifth contact of one of its banks, completes the circuit for the soleniod SS of the switches S1—S4 previously prepared by the closure of contacts RL134.

Upon release of relay RL13 just before the twenty sixth interrogation pulse is transmitted, the circuits of SS is interrupted and it steps the switches S1—S4 on to the next contact thus routing the twenty sixth and subsequent series of interrogation pulses to line 2, and the consequent response pulses to another bank of the uniselector.

As shown in FIGURE 6 there are five banks on the uniselector which could be used for response pulse storage but since only four lines are shown the fifth operation of the uniselector can be disregarded for present purposes. The inclusion of this fifth bank provides a time delay between successive complete interrogation cycles which may be used for other purposes such as analysis of recorded information. The switch S4 functions as a cancellation switch and is arranged to apply positive potential to each of the block C circuits associated with a bank of the uniselector, one step ahead of the switch S3 which applies the response pulses to the respective banks. Thus the information stored in the block C circuits associated with line 1 bank of the uniselector remains stored until switches S1—S3 reach their fifth position and switch S4 reaches the first position on its second revolution. At this point the potential applied by switch S4 energizes relay RL16 in each block C circuit of the line 1 bank of the uniselector. Relay RL16 opens its contacts RL161 thus interrupting its own energizing circuit and closes its contacts RL162 which complete a circuit for drive solenoid DS. Relay RL16 operates and releases successively at a rate determined by the time constant of its shunt circuit thus repeatedly driving the rotary switch round its contacts until it reaches a point where the earthly connection to relay RL16 via the rotary switch is interrupted. At this point no further energisation of relay RL16 can take place and the rotary switch remains at this setting until solenoid DS is energised over the corresponding uniselector contact by an expanded response pulse from relay RL15 as previously explained. Preferably this restoring of the rotary switch is effective to clear down the recorder RC which may be of any conventional type and which is connected to record the position to which the rotary switch is driven by the response pulses. If the recorder is of the continuous type for instance a chart recorder, the "clearing down" may consist in moving the chart so that the next recording is not superimposed on the previous recording.

FIGURE 7 is a circuit diagram of a modified form of responder unit for use in association with each broadcast receiver of the system.

Interrogation pulses from the transmitting apparatus at the central station are received over the line and applied by transformer T21 to the grid of a limiting amplifier input stage comprising valve V21. The input circuit to V21 includes a diode D4 connected to the junction of two resistors R25 and R26 the other end of resistor R26 being connected to the junction of two resistors R25 and R26 the other end of resistor R26 being connected to the junction between two further resistors R27 and R28 in the cathode circuit of V21. The resistors R27 and R28 are respectively shunted by capacitors C23 and C24. The arrangement and values of the components in this input circuit are such that only positive pulses of sufficient amplitude to overcome the bias on diode D4 are applied to the grid of V21 and if the amplitude of such pulses exceeds a predetermined limit it is attenuated by grid-cathode conduction. As an example the bias on D4 may be 5 v. and any signal exceeding 10 v. is attenuated. In this way the responder is rendered insensitive to line noise under 5 v. amplitude and is protected against overload effects of large input signals. As mentioned previously this circuit is also used for the input amplifier stage of the block B circuit of FIGURES 6A to 6D.

Valve V21 receives its anode potential over normally closed contacts RL211 of a relay RL21 the operation of which will be described later. The negative output pulse at the anode of V21 which is produced by the application of an interrogation pulse to its grid circuit is applied through capacitor C25 and a diode D2 to the right hand anode of a double triode valve V22, arranged as a monostable multivibrator, which anode is coupled to the control grid of the left hand triode section of V22 through capacitor C26. The stable state of V22 is with the left hand section conducting and the right hand section nonconducting so that the application of the negative pulse to the grid of the left hand section switches V22 to its unstable state with the right hand section conducting. This unstable state persists for a period determined by the values of R30 and C26 which for example are chosen to give a period of 363 ms.

The anode of the right hand section of V22 is coupled by capacitor C29 and resistors R39 and R40 shunted by diode D3 to the grid of a further valve V23 which, together with valve V24 constitutes another monostable multivibrator circuit. The values of resistors R39 and R40 are chosen to give a substantial attenuation of voltage changes at the anode of the right hand section of V22, such attenuation being of the order of 10:1 for example, so that the negative pulse from V21 which is applied to this anode is ineffective to switch stage V23, V24 but the fall in anode potential which this pulse produces by causing the right hand section of V22 to conduct is sufficient to switch stage V23, V24.

The stable state of this latter stage is with V24 held non-conducting by the bias on the cathode supplied by the resistor chain R47, R46, R45. Valve V23 acts as a high gain voltage amplifier and in response to the differentiated negative pulse applied to its grid it produces a positive voltage pulse which is applied through capacitor C30 and resistor R44 to the control grid of valve V24. This latter valve conducts and develops a voltage across common cathode resistor R45 which cuts off valve V23. This unstable state is maintained for a period determined principally by the values of capacitor C30 and resistor R44.

The coil of a relay RL23 is included in the anode circuit of valve V24 so that when this valve conducts relay RL23 is energised. Relay RL23 is the driving means of a rotary switch mechanism arranged to be stepped round one position each time relay RL23 releases. The switch mechanism includes an adjustable cam AC which can be set to close normally open contacts RL231 of any desired number of steps of the mechanism. It also includes a moving contact arm CA which is arranged to pass in contacting engagement over each of a number of fixed contacts FC of which three FC1—FC3 are indicated in FIGURE 7. The arm CA comes to rest at the end of each step midway between two of the contacts so that the contact between the arm CA and a fixed contact FC is only made during movement of the arm.

Assuming for example that the responder illustrated in FIGURE 7 has its cam AC set to close contacts RL231 after four steps, the first three interrogation signals received over the line will not operate the responder. The fourth interrogation signal will cause relay RL23 to step the rotary switch mechanism a fourth step and cam AC will close contacts RL231. The closing of these contacts applies positive potential through the closed contacts of a make-before-break contact set RL213, through normally closed contacts RL212, resistor R32, and adjustable resistor P1 to the coil of relay RL21 which is thus energised. Relay RL21 is shunted by a thermistor R31 which after a time delay determined by the setting of adjustable resistor P1 and the thermal delay of the thermistor, serves as an effective short circuit across the coil of relay RL21 so that the latter releases. When relay RL21 operates it locks in over the normally open contacts of its contact set RL213 and at its contacts RL212 brings resistor R33 into circuit in its energising path. At its contacts RL211 it interrupts the anode supply to valve V21 thus isolating the responder stages V21—V24 from the input circuit.

The closing of contacts RL231 of relay RL23 also applies positive potential over adjustable resistor P2 and resistor R42 to the grid of valve V24. This causes valve V24 to oscillate at a frequency determined by the setting of P2 and to feed a train of impulses to the coil of relay RL23. These impulses cause the switch mechanism controlled by relay RL23 to step on one step for each impulse and move the contact arm CA over each of the fixed contacts FC in turn. Fixed contact FC1 applies a pulse of positive potential from the contact arm CA to the winding of a response impulsing relay RL22 the changeover contacts RL221 of which connect the positive supply line through resistor 24 to the secondary winding of the input transformer T21 for the duration of the impulse applied to the coil of relay RL22. This impulse is the first response impulse returned over the line by the responder.

Subsequent steps of relay RL23 apply pulses of positive potential to fixed contacts FC2 and FC3 which apply these pulses to impulsing relay RL22 in dependence upon the condition of two further relays RL24 and RL25. If relay RL24 is not energised the second and third pulses are not applied to relay RL22 and only the first response impulse is received at the central station over the line. If relay RL24 is operated and RL25 is not operated, the second positive pulse from contact FC2 is applied over contacts RL241 (closed) to relay RL22 and two response impulses are sent over the line. If both relays RL24 and RL25 are operated, the contacts RL241, RL242 and RL251 are all closed and the pulses from both contact FC2 and FC3 are applied to relay RL22 with the result that three response impulses are sent over the line.

Figure 4:
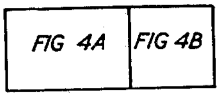
Figure 4:
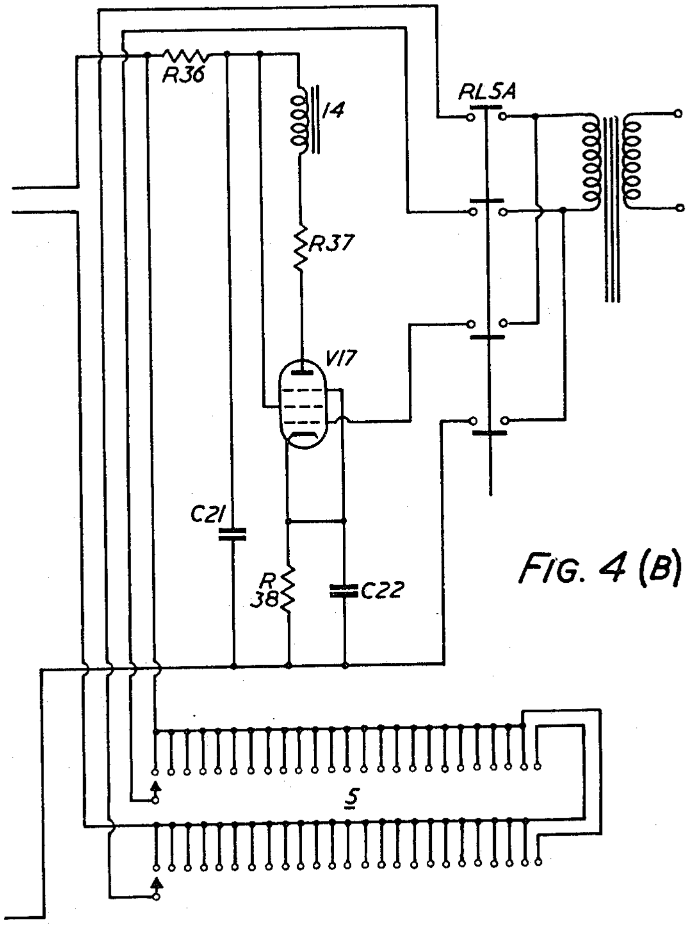

Relays RL24 and RL25 are arranged to be energised in dependence upon the operative condition and the channel selection respectively of the broadcast receiver with which the responder is associated and as described in connection with FIGURE 4 the single response impulse indicates that the responder is operative but the associated receiver is switched off, two response impulses indicate that the receiver is switched on and tuned to channel A and these response impulses indicate that the receiver is switched on and tuned to channel B.

With a larger number of fixed contacts FC and of relays such as RL24 and RL25 a larger number of response impulses can be used to indicate selection between a larger number of tuning channels.

When the contact arm CA has passed over all the fixed contacts FC the cam AC allows contacts RL231 to open and thus disconnect the drive potential from valve V24 which ceases to step relay RL23. Relay RL21 is maintained energised over its contacts RL213 until the time delay determined by thermistor R31 has elapsed whereupon relay RL21 releases and closes its contacts RL211 to restore the anode supply to valve V21. The restoration of this anode supply causes an additional pulse to be applied to the circuits following valve V21 with the result that relay RL23 steps the rotary switch mechanism a further step to restore it to its zero position in readiness for the next operation of the responder.

What is claimed is:

1. A remote indication system comprising a central station, a plurality of responder stations remote from said central station, at least one communication path interconnecting said responder stations with said central station, said central station including interrogation pulse-generating means connected to apply repeated series of interrogation pulses to said communication path, and each of said responder stations including a responder comprising response pulse-generating means and stepping means responsive to interrogation pulses received over said path to step one step for each pulse received whereby to count said pulses, each said stepping means being responsive to the counting of a predetermined number of said pulses, which number is different for each responder station, to step a plurality of steps in the period between the last pulse of said predetermined number of pulses and the next succeeding pulse of the series to control the generation of at least one response pulse by said response pulse-generating means, the responder at each responder station including a limiting electronic amplifier input stage followed by a monostable multivibrator stage the pulse output of which is applied to the first stage of a further two-stage multivibrator functioning as a monostable stage in response to such pulse output and also functioning as an astable multivibrator in response to a D.C. input to the second stage thereof, pulse counting means settable to respond to a predetermined one of a series of pulses applied thereto by said further multivibrator to apply said D.C. input to said second stage, and means for coupling the response pulse to said communication path.

2. A system as set forth in claim 1, wherein each said response pulse-generating means is controlled by said stepping means to return a first response pulse over said communication path to indicate that the responder of the station including such response pulse-generating means is operative, and a variable number of additional response pulses in dependence upon the condition of associated apparatus at said responder station.

3. A system as set forth in claim 2, wherein said associated apparatus is a broadcast receiver tunable to any one of a number of channels and controllable to be operative and inoperative, the absence of additional response pulses indicates when said broadcast receiver is in inoperative condition, a single additional response pulse is returned when said broadcast receiver is in operative condition and tuned to a first one of said channels, and two additional response pulses are returned when said broadcast receiver is operative and tuned to a second channel.

4. A system as claimed in claim 1 in which said pulse counting means is responsive to said predetermined pulse to energise a relay means rendering the responder input stage insensitive to any pulses in the communication path during a predetermined period after energisation of said relay means.

5. A system as claimed in claim 4 in which said relay means comprises an electromagnetic relay having an operating coil shunted by a thermistor, the resistance of said thermistor falling during said predetermined period to a value that effectively short circuits said relay means for releasing said relay means at the end of said period.

6. A system as claimed in claim 5 in which said relay means is arranged to open contacts connected in the anode supply to said limiting amplifier input stage to render the responder insensitive to pulses in the communication path.

References Cited in the file of this patent

UNITED STATES PATENTS

| | | |
|---|---|---|
| 2,584,739 | Rees et al. | Feb. 5, 1952 |
| 2,616,959 | Breese et al. | Nov. 4, 1952 |
| 2,664,561 | McIlwain | Dec. 29, 1953 |
| 2,719,284 | Roberts et al. | Sept. 27, 1955 |
| 2,794,179 | Sibley | May 28, 1957 |
| 2,864,943 | Schultz | Dec. 16, 1958 |
| 3,034,707 | Jefferson | May 15, 1962 |